United States Patent [19]
Eggebrecht

[11] Patent Number: 5,079,021
[45] Date of Patent: Jan. 7, 1992

[54] CHEESE PROCESSING METHOD

[75] Inventor: Lea Eggebrecht, Abbotsford, Wis.

[73] Assignee: Welcome Dairy, Inc., Colby, Wis.

[21] Appl. No.: 586,258

[22] Filed: Sep. 21, 1990

[51] Int. Cl.$^5$ .............................................. A23C 19/00
[52] U.S. Cl. .................................... 426/515; 426/582
[58] Field of Search ............. 426/515, 517, 582, 524; 99/453, 460, 465; 249/112, 129

[56] References Cited

U.S. PATENT DOCUMENTS

| | | | |
|---|---|---|---|
| 34,726 | 7/1901 | Simon | 249/129 |
| 696,686 | 4/1902 | Lyons | 249/112 |
| 986,835 | 3/1911 | Lewis | 249/81 |
| 1,505,999 | 8/1924 | Gereke | 249/112 |
| 1,581,043 | 4/1926 | Ey | 249/129 |
| 1,963,878 | 6/1934 | Bagby | 99/452 |
| 2,324,636 | 7/1943 | Miollis | 99/452 |
| 2,512,809 | 7/1950 | Perry et al. | 249/112 |
| 2,625,877 | 1/1953 | Pullen | 249/129 |
| 3,650,030 | 3/1972 | Delamere | 425/408 |
| 4,289,793 | 9/1981 | Gustafson et al. | 426/515 |
| 4,456,142 | 6/1984 | Burling | 99/452 |
| 4,492,153 | 1/1985 | Grabowski | 99/460 |
| 4,628,805 | 12/1986 | Derode | 99/453 |

*Primary Examiner*—George Yeung
*Attorney, Agent, or Firm*—Michael, Best & Friedrich

[57] ABSTRACT

A method and apparatus for processing cheese comprises charging molten process cheese into a mold consisting of a plurality of cardboard lined, open-ended mold cavities oriented in spaced rows and circulating cooling air between and around each row to effect cooling of the cheese to the desired temperature. The rows of columns are defined by pairs of parallel side panels and crossed partitions formed of a rigid material and defining cavities which are elongate and rectangular in cross section. Support members hold the rows of columns in a parallel, spaced apart relation. After cooling, the mold is elevated, allowing the cheese columns covered by cardboard to be discharged from the lower ends of the mold cavities.

3 Claims, 1 Drawing Sheet

CHEESE PROCESSING METHOD

BACKGROUND OF THE INVENTION

This invention relates to process cheese and more particularly to a method and apparatus for molding process cheese into uniform rectangular columns.

The production of process cheese involves the heating of natural cheese and emulsification with alkaline salts. Process cheese is normally sold in three forms. These include slices, five-pound loafs, and bulk sizes which can be cut into consumer sizes. The largest size block of process cheese which is normally produced is about 40 pounds and has a volume of about 1,000 cubic inches. This is about the maximum size block of process cheese that can be molded and still be sufficiently cooled. If process cheese is not cooled rapidly enough, it develops a brownish appearance or other discoloration.

The most common practice is to mold process cheese into a form consisting of corrugated paper with an inner plastic liner. Rounded corners frequently result because the plastic liner seldom adheres perfectly to the inside of the corrugated paper form. In addition, the corrugated form has a tendency to bulge due to the heat and the mass of the cheese. Also, the surface of the cheese block tends to be relatively irregular as a result of the fact that as process cheese cools, air bubbles trapped when the cheese is agitated during the manufacturing process rise to the surface. Because marketing requires that the cheese block be relatively square, these bulges and irregularities, amounting to about 10 percent of the cheese block, must be trimmed. Since only about half of this trim can be reworked into the cheese-making process, substantial wastage results.

SUMMARY OF THE INVENTION

It is an object of the invention to provide a new and improved process and apparatus for molding process cheese.

Another object of the invention is to provide a method and apparatus for molding process cheese wherein the amount of trim wastage is substantially reduced.

A further object of the invention is to provide a method and apparatus for molding process cheese wherein wastage is substantially reduced.

Yet another object of the invention is to provide a method and apparatus for molding process cheese wherein relatively uniform rectangular cheese blocks can be produced with a minimum of trimming.

A still further object of the invention is to provide a method and apparatus for molding process cheese wherein relatively larger blocks of cheese can be produced than with existing molding methods.

These and other objects and advantages of the present invention will become more apparent from the detailed description thereof taken with the accompanying drawings.

DETAILED DESCRIPTION OF THE PREFERRED EMBODIMENT

Figure 1:
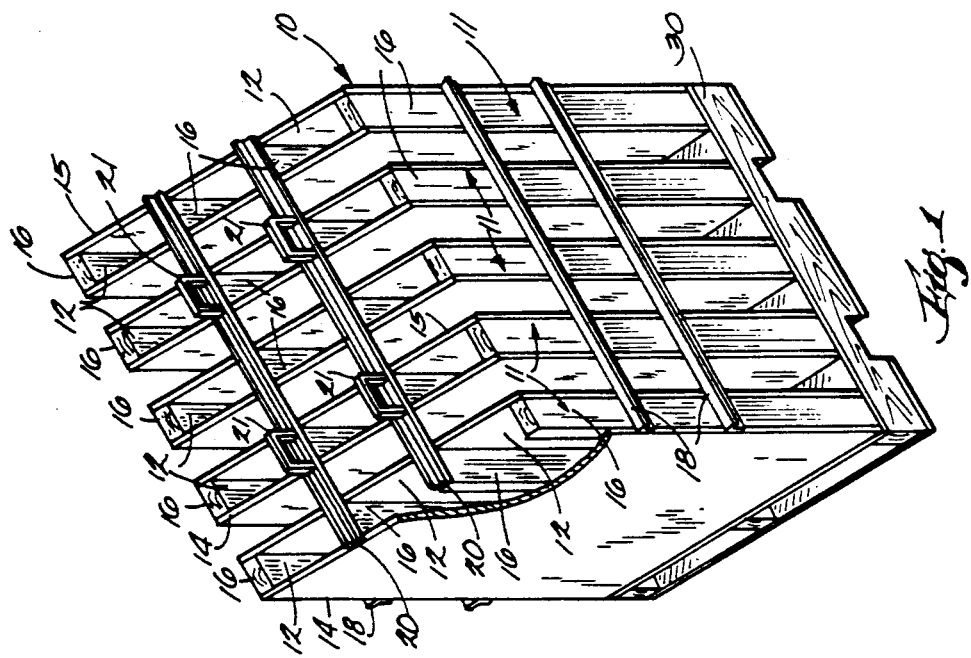
FIG. 1 is a perspective view showing the mold in accordance with the preferred embodiment of the invention.

FIG. 1 shows the preferred embodiment of the form 10 in which the method according to the invention is practiced. Those skilled in the art will appreciate that modifications in the illustrated form may be made without deviating from the inventive concept.

The form 10 includes a plurality of spaced apart rows 11 of vertically-oriented, rectangular in cross section mold cavities 12. While five rows 11 of mold cavities 12 are illustrated and while three mold cavities 12 in each row are shown, it will be appreciated that any convenient number may be employed.

Each row 11 is formed by a pair of identical, rectangular side panels 14 and 15 and a plurality of substantially identical partitions 16. As seen in FIG. 1, the partitions 16 all have a length equal to the height of the panels 14 and 15 and identical widths. In addition, the partitions are arranged in parallel, spaced apart relation between the panels 15 and 16, with two partitions 16 defining the ends of each row and two intermediate partitions 16 separating the individual mold cavities. The partitions 16 are all arranged parallel to each other and maintain the panels in a parallel, spaced apart relation to define a plurality of elongate mold cavities 12 which are rectangular in cross section.

The rows 11 of cavities 12 are maintained in a parallel, spaced apart relation by a plurality of cross members 18 which are affixed to the side edges of the panel members 15 and 16 and upper brace members 20 which are fixed to the upper edges of the panel members 15 and 16 and the intermediate partitions 16. The braces 18 and 20 may be formed of any conventional structural member which, in the illustrated embodiment, comprises an angle member. Mounted on each of the upper braces 20 is a pair of lift hooks 21 whose purpose will be described more fully below.

The panel members 14 and 15 and the partitions 16 may be formed of any suitable material, such as wood or stainless steel. In the case of wood, the members can be joined with any conventional fasteners or, in the case of stainless steel, by welding.

Figure 2:
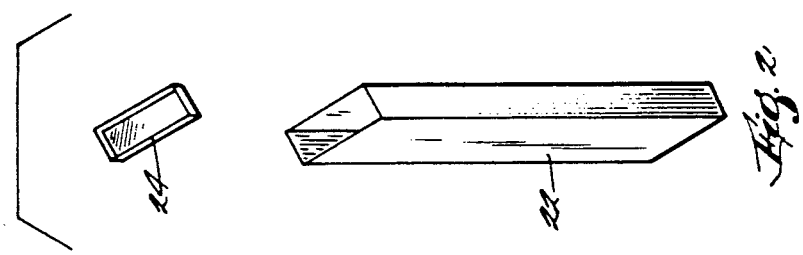
FIG. 2 shows a cardboard liner used with the mold shown in FIG. 1.

FIG. 2 shows the mold liner in accordance with the preferred embodiment of the invention. Preferably, this consists of a food-grade, poly-coated chipboard box having a removable cover 24 of the same material. The dimensions of the box 22 and the cover 24 are such that they will be slideably received within the mold cavities 12 with the outer sides engaging the inner walls of the cavity.

Figure 3:
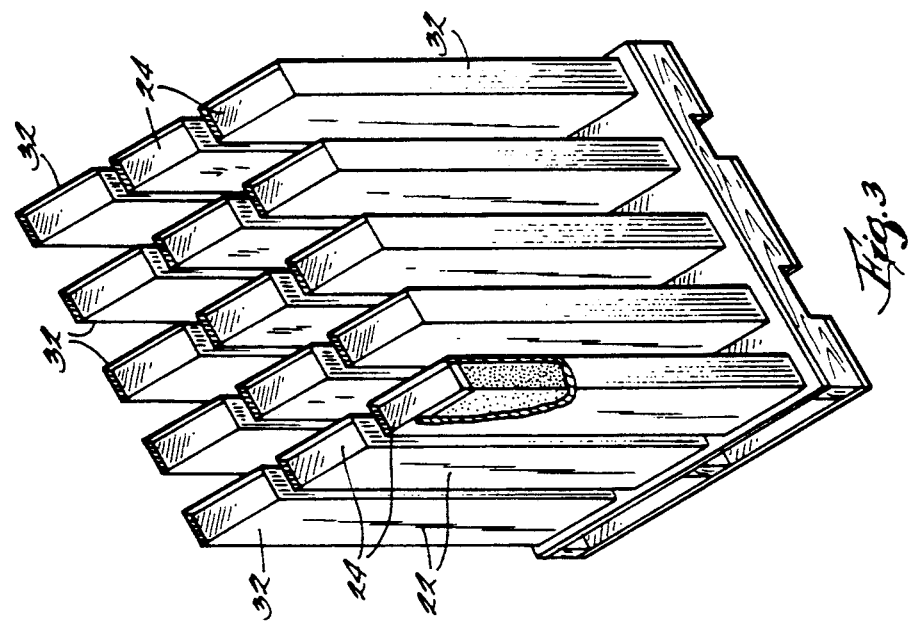
FIG. 3 illustrates the cardboard covered process cheese columns after the completion of the molding operation.

In operation, the form 10 is placed on a pallet 30 of any appropriate type and size. The cardboard containers 22 are then inserted into each mold cavity 12, after which molten process cheese, typically at a temperature of about 170° F., is poured into each container 22. It will be appreciated that the cardboard boxes 22 need be filled only to the height necessary to achieve the desired sized cheese block. The pallet is then elevated and transported to a cold room which is typically at a temperature of about 40° F. Here the cheese slowly cools over a period of about 48 hours to the temperature of the cold room or about 40° F. It is desirable that the cheese cool at a relatively slow rate to minimize shrinkage. The form containing the molded cheese columns and the pallet are then removed from the cold room, after which a lifting device, such as a forklift, is employed for raising the form 11 vertically by means of the lift hooks 21. The cardboard covered cheese columns 32 discharge from the open lower ends of the mold cavities 12 and remain as free-standing as shown in FIG. 3. The polyurethane coating on the boxes minimizes friction between the outer surface of the boxes and the form 10. The cheese columns 32 may then be placed in cold storage or transported to a cutting area where the outer cardboard boxed 22 are removed and the cheese cut into blocks of the desired size.

Because the form 11 supports the cheese column during the pouring and cooling steps, each of the cheese columns has relatively planar sides and square corners. As a result, very little, if any, trimming of these portions of the columns is required.

In addition, because the columns are oriented vertically during pouring and cooling, all of the dissolved air which discharges from the cheese passes upwardly through the relatively small upper surface of the column. Therefore, it is only necessary to trim this portion of the cheese columns before packaging. Since the upper portion of the column represents only about one percent of the total cheese volume, only a relatively small portion of the column need be trimmed. This substantially minimizes wastage over prior art methods.

It has been found that in order to achieve the desired cooling rate, no portion of the cheese should be more than three inches from a surface exposed to cooling air. It is, therefore, desirable to limit the thickness of the mold cavities to about six inches or less. However, merely by lengthening the mold cavity 10 or increasing its width, the overall weight of each cheese block can be widely adjusted.

While only a single embodiment of the invention has been illustrated and described, it is not intended to be limited thereby, but only by the scope of the appended claims.

I claim:

1. A method of processing cheeses including the steps of: providing mold means defining a plurality of rows of spaced apart mold cavities, each mold cavity being vertically oriented, open-ended and rectangular in horizontal cross section, said mold means being sufficiently rigid to resist bulging under the weight of a column of cheese disposed therein, inserting into each mold cavity a cardboard liner sized to fit within the cavity and wherein said mold means provides support against outward bulging of the cardboard liner, pouring into each cardboard liner a quantity of process cheese to form a column of process cheese therein, circulating cooling air along the outside of each row of mold cavities and between said rows for cooling said columns of process cheese to a predetermined temperature, elevating the mold cavity defining means so that the cardboard covered cheese columns are discharged from the lower end thereof and removing the cardboard liners and cutting the cheese columns to desired lengths.

2. The method set forth in claim 1 and including the step of limiting the thickness of each mold cavity so that no point therein is more than about three inches from a mold surface exposed to cooling air.

3. A method of processing cheese including the steps of: providing mold means defining a plurality of rows of spaced apart mold cavities, said mold cavities being elongate, vertically oriented and open-ended, said mold means being sufficiently rigid to resist bulging under the weight of a column of cheese disposed therein, inserting into each of a plurality of mold cavities a liner sized to fit within the cavity and wherein said mold means provides support against outward bulging of the liner, inserting into each of a plurality of liners a quantity of process cheese to form a column of process cheese in each, circulating cooling fluid along the outside of each row of mold cavities and between said rows for cooling said columns of process cheese to a predetermine temperature, separating the cheese columns from the mold cavity defining means, removing said liner from said cheese columns and cutting the cheese columns to desired sized pieces.

* * * * *